United States Patent [19]
Andrews et al.

[11] Patent Number: 5,726,754
[45] Date of Patent: Mar. 10, 1998

[54] VARIABLE-SPEED SCANNING FOR INTERFEROMETRIC MEASUREMENTS

[75] Inventors: Michael P. Andrews; Paul R. Unruh, both of Tucson, Ariz.

[73] Assignee: Wyko Corporation, Tucson, Ariz.

[21] Appl. No.: 697,865

[22] Filed: Aug. 30, 1996

[51] Int. Cl.$^6$ .................................................... G01B 9/02
[52] U.S. Cl. ........................................ 356/357; 356/359
[58] Field of Search ............................. 356/357, 358, 356/359, 360

[56] References Cited

U.S. PATENT DOCUMENTS

| | | | |
|---|---|---|---|
| 5,122,648 | 6/1992 | Cohen et al. | 250/201.3 |
| 5,446,547 | 8/1995 | Guenther et al. | 356/357 |
| 5,471,303 | 11/1995 | Ai et al. | 356/357 |

*Primary Examiner*—Frank G. Font
*Assistant Examiner*—Amanda Merlino
*Attorney, Agent, or Firm*—Antonio R. Durando

[57] ABSTRACT

A method of operation of a scanning mechanism that produces multiple constant-speed translations within the scanning range of operation. According to one aspect of the invention, when the instrument translates over a region where useful fringes are substantially absent, such as over the steep portion of a step discontinuity, the scanner is quickly accelerated to a higher constant speed and collection of intensity data is stopped until it reaches a new region of observable fringes. The scanner then is quickly decelerated to a slower constant speed and acquisition of intensity data resumes. According to another aspect of the invention, the position of the scanner during the nonlinear transition between regions of different constant speeds is determined by applying a transition factor based on the rate of acceleration (or deceleration) during the transition period. A practical transition factor is advantageously determined by assuming constant acceleration (or deceleration) during each transition between periods of constant-speed operation.

15 Claims, 4 Drawing Sheets

VARIABLE-SPEED SCANNING FOR INTERFEROMETRIC MEASUREMENTS

BACKGROUND OF THE INVENTION

1. Field of the Invention

This invention is related in general to the field of scanning interferometry and, in particular, to a motorized device for effecting the vertical scanning motion of a sample or of an optical microscope objective about a focal point.

2. Description of the Related Art

Vertical scanning interferometry (VSI) is a technique where white light is used as a source in an interferometer and the degree of fringe modulation, or coherence, of the interference fringes is measured for various distances between a test surface and the optics of the interferometer (each corresponding to a different optical path difference, OPD) to determine surface height. The method typically involves vertical scanning of the reference arm of the interferometer with respect to a stationary sample and calculation of the relative modulation of the intensity signal as a function of vertical position. VSI techniques have been used successfully in overcoming the limitations of surface height measurements encountered in conventional phase shifting interferometry.

As illustrated in simple schematic form in FIG. 1 and described in further detail in U.S. Pat. No. 5,122,648 issued to Cohen et al., herein incorporated by reference, typical vertical scanning interferometric equipment 10 comprises a white-light source 12 directing a beam L of white light through a conventional illuminator 14 toward a beam splitter 16, which reflects the light downward in the direction of a test surface S. The light reflected by the beam splitter 16 first passes through a microscope objective 22 focused on the test surface S, which incorporates an interferometer (such as Mirau) comprising a beam splitter and a reference mirror (housed in a reference arm not shown in the drawings), so that two light beams are generated for producing interference fringes as a result of the optical path difference between the reference mirror and the test surface S. Thus, as is well understood by those skilled in the art, the beams reflected from the reference mirror and the test surface S pass back up trough the microscope objective 22 and upward through the beam splitter 16 to a solid-state imaging array 24 positioned in a camera 26 in coaxial alignment with the objective 22. The imaging array 24 consists of individual charge-coupled-device (CCD) cells or other sensing apparatus adapted to record a two-dimensional array of signals corresponding to interference effects produced by the interferometer as a result of light reflected at individual x-y coordinates or pixels in the surface S and received at corresponding individual cells in the array. Appropriate electronic hardware (not shown) is provided to process the signals generated by each cell and transmit them to a computer for further processing. Thus, an interference-fringe map is generated by detecting the intensity of the light signal received in each cell of the array 24.

In vertical scanning interferometry, a profile of the surface S is produced by repeating the measurement at different, constant-interval distances between the objective 22 and the test surface S (that is, at different elevations of the scanning mechanism), so as to provide information concerning the variation of light intensity at each pixel as the corresponding optical path difference is varied systematically with respect to an initial reference point. Thus, the position of the scanning mechanism corresponding to maximum interference at each pixel is determined and used, based on the distance from the reference point, to calculate the height of the surface at that pixel. Therefore, either the objective 22 or the test surface S is moved vertically to produce these repeated measurements (vertical scanning). It is noted that the present description is based on the configuration of a Mirau interferometer but, as one skilled in the art would readily understand, it is equally applicable to any of the other instruments used in vertical scanning interferometry, such as Michelson, Linnik or Fizeau.

For years, interferometric scanning utilized piezoelectric transducers (also known as PZT ceramics) to translate the sample or the reference arm in the interferometer (which is normally incorporated in the optical microscope objective), with respect to the fixed sensor. For white-light scanning interferometry, the scan range provided by PZT elements can be about 100 μm, while for conventional phase-shifting interferometry scanning is typically limited to a few wavelengths of light, or less than 1 μm. PZT translators are used because they provide very smooth motion with quick response over the small distances required for phase-shifting measurements and because they can be easily controlled by either closed-loop control techniques (such as by linear-variable-differential-transformer position sensing—LVDT) or by open-loop configurations.

In order to increase the range of operation of vertical scanning interferometry and avoid the nonlinear response and hysteresis effects of piezoelectric elements, these have been recently replaced by or combined with motorized translators with scanning ranges in excess of 500 μm, which is many times greater than the range available with piezoelectric transducers alone. See U.S. Pat. No. 5,446,547, hereby incorporated by reference. This greatly expanded range of operation has proven to be very useful in mapping surfaces containing large steps between pixels, such as for quality-control measurements of solder bumps in electronic devices.

During vertical scanning of the sample surface, the scanning mechanism (either PZT or motorized) is controlled to quickly reach a predetermined scanning speed and then move at constant velocity through the scanning range of operation. As those skilled in the art readily understand, typically LVDT measurements are taken periodically during scanning to control the speed through a feed-back loop to ensure nearly perfect linear behavior of the translation mechanism. Based on the constant speed of motion of the scanner, its vertical distance relative to an initial datum is known after each subsequent time interval. Thus, light-intensity frames taken at predetermined time intervals can be associated with corresponding relative vertical positions to calculate surface heights at each pixel. It is noted that each height measurement is predicated upon relative elevations of the scanning mechanism during scanning, rather than upon absolute values, and that the precision of the measurements is critically dependent upon the linear behavior of the scanning device during its vertical translation. Moreover, since the spatial resolution of the interferometer is determined by pixel size, any steep discontinuity occurring within a single pixel in the sample surface is likely not to produce useful fringes during vertical scanning. For the purposes of the present invention, a step discontinuity is defined as one that, within the characteristics of the instrument at hand, is likely not to produce useful fringes during vertical scanning.

An example of a test surface having step discontinuities is shown in the partial surface profile of FIG. 2, where a solder bump 30 is illustrated protruding approximately 100 μm from the lower surface 32 of the sample. When interferometric measurements are made of such a surface, because of the steep step around the bump 30, the clear formation of fringes and the corresponding generation of useful data is limited to the pixels outside the area where the steep step occurs (i.e., pixels 9 and 14 in the example would probably not produce clear fringes at any elevation). Thus, while scanning in the Z direction over the surface being tested, between the bottom surface 32 and the bump's top surface 34 the interferometer necessarily scans a large distance during which no useful information is gathered (the Z distance corresponding to the step). Because all scanning mechanisms operate in linear fashion at constant speed, scanning over the wide ranges provided by motorized technology is inefficient whenever the instrument is not gathering useful data. Ideally, the instrument would scan within a range sufficient to profile the bottom surface 32 (shown as approximately −5 to +5 μm in the example of FIG. 2) and then instantaneously shift to the top surface 34 (seen as about 105 to 115 μm in the figure), thus avoiding dead time and useless sampling while translating between the two surfaces. In practice, this is a problem associated with all step discontinuities within the larger ranges currently being scanned. This invention provides a procedure and apparatus for greatly reducing this inefficiency and improving the overall data gathering function of the instrument.

BRIEF SUMMARY OF THE INVENTION

One primary objective of this invention is a vertical scanning approach that is advantageously operable over large scanning distances to increase the speed of operation and the efficiency of the data gathering function.

Another important goal of the invention is a method and apparatus that enable vertical scanning with no data gathering within elevation ranges corresponding to large step discontinuities.

Yet another goal is a method and apparatus that ensure scanning with accelerated vertical shifts between surface areas separated by step discontinuities.

Another objective of the invention is a procedure that can be implemented in conjunction with conventional feed-back loop control algorithms and/or hardware.

Still another objective is a method and apparatus that are suitable for incorporation within existing instruments.

A final objective is a procedure that can be implemented easily and economically according to the above stated criteria.

Therefore, according to these and other objectives, the present invention consists of a scanning mechanism and a method of operation thereof capable of multiple constant-speed translations within the scanning range of operation. According to one aspect of the invention, when the instrument translates over a region where useful fringes are substantially absent, such as over the steep portion of a step discontinuity, the scanner quickly accelerates to a higher constant speed and stops collecting intensity data until it reaches a new region of observable fringes. The scanner then quickly decelerates to a slower constant speed and resumes acquisition of intensity data. According to another aspect of the invention, the position of the scanner during the nonlinear transition between regions of different constant speeds is determined by applying a transition factor based on the rate of acceleration (or deceleration) during the transition period. A practical transition factor is advantageously determined by assuming constant acceleration (or deceleration) during each transition between periods of constant-speed operation.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
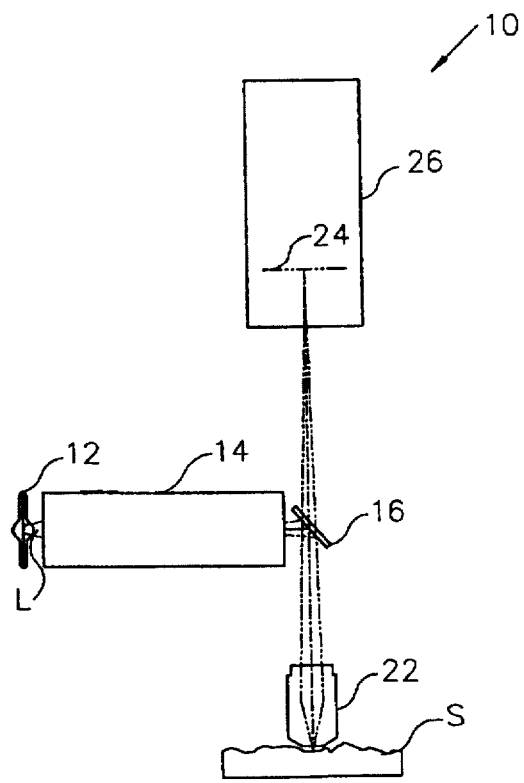
FIG. 1 is a simplified schematic representation of prior-art apparatus used in vertical scanning interferometry.

The present invention consists of two main inventive concepts. The first one relates to the use of a scanning mechanism with variable speeds to adapt the velocity of translation to the operating requirements of the sample being tested. This idea is significant because the precision of interferometric profilers depends greatly on constant speed of scanning and the focus of past efforts in the field has been toward achieving nearly instantaneous ramping of the scanning mechanism to a predetermined speed and then toward maintaining that speed at a constant level throughout the translation of the scanner. Thus, as well understood by those skilled in the art, a precise correlation between scanning time and elevation is maintained and exact height measurements can be made as a function of interference fringes observed during scanning.

The second inventive concept regards the procedure devised to correct the uncertainty introduced by changing the speed of scanning during operation. Since any change of speed necessarily involves a transition time during which the scanner shifts from a first to a second level of constant speeds, it is necessary to be able to identify the transition period and calculate the exact z-elevation traveled by the scanner during that time. We recognized that the acceleration and deceleration of the scanner in transition are (or can be made) approximately constant if the voltage applied to the actuating means is increased (or decreased, as applicable) in step-wise fashion, thereby providing an easily measurable quantity to determine the time of transition and the distance traveled during it.

It is noted that the embodiments of the present invention are described with reference to x, y and z orthogonal coordinates wherein x and y define a horizontal plane and z defines a vertical direction, but it is obvious that the structure and operation of the features detailed herein could be rotated in any direction with equivalent results. It is also understood that the sizes of the various components shown in the drawings are not drawn to relative scale because of the very small dimensions of some features in comparison to others illustrated in the figures; rather, they are represented only schematically for illustration.

Figure 2:
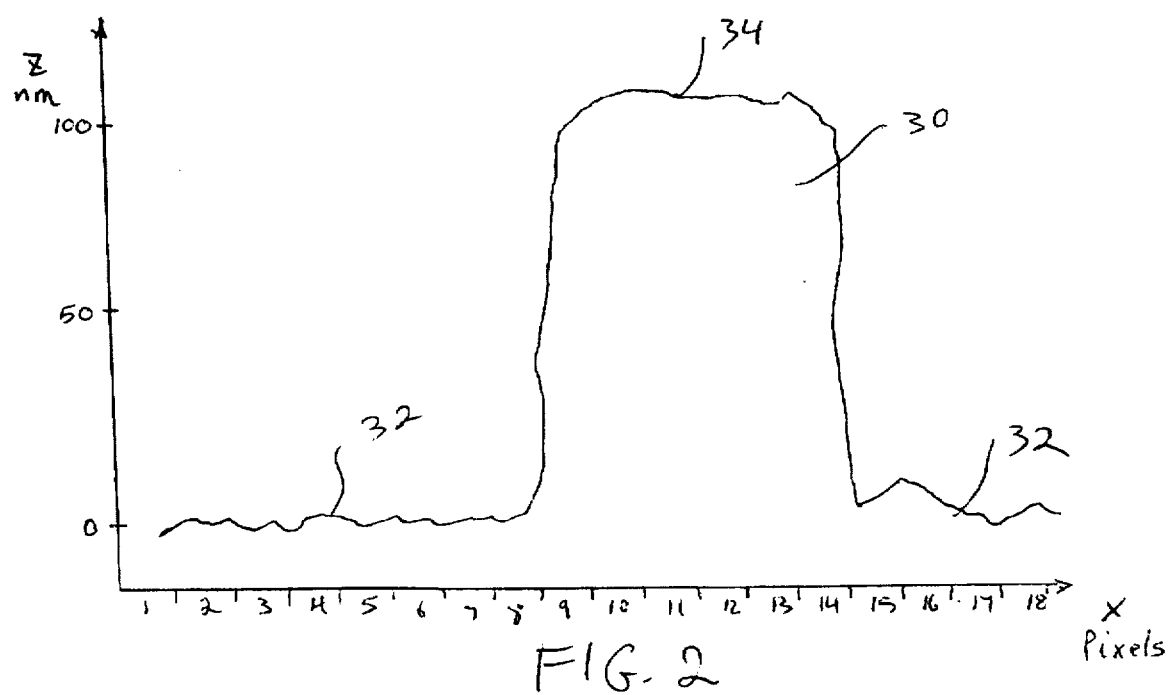
FIG. 2 is a height profile plot of a surface with a large step discontinuity.
Figure 3:
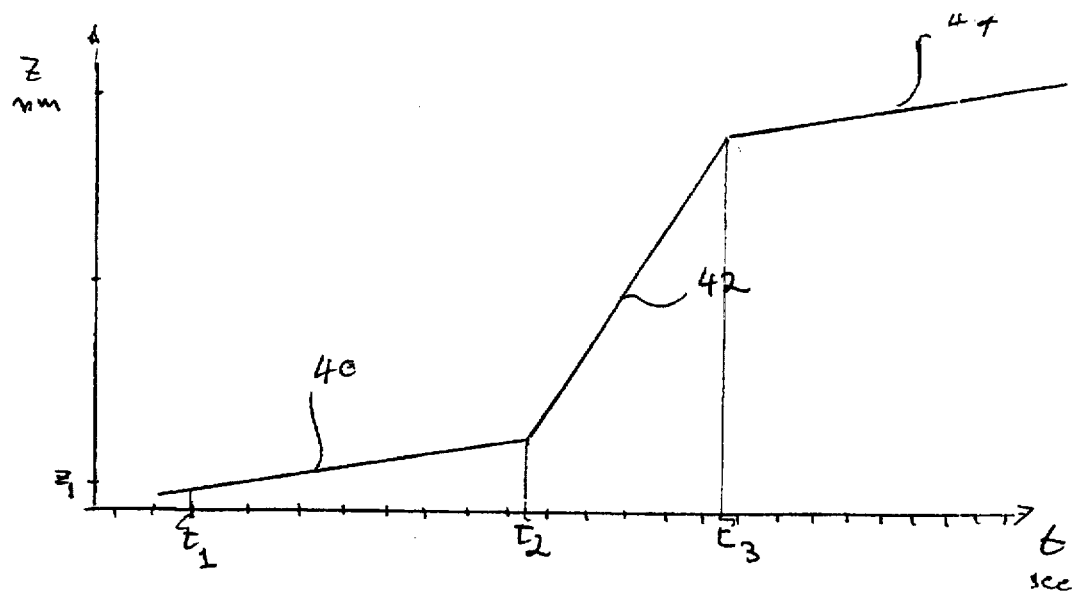
FIG. 3 illustrates the z position-versus-time plot of an ideal scanner operated according to this invention.

Referring to the drawings, wherein like parts are designated throughout with like numerals and symbols, FIG. 3 illustrates the z position-versus-time plot of an ideal scanner operated according to this invention. This ideal scanner would be first operated at an initial constant translation speed corresponding to the slope of segment 40 of the plot during which light intensity frames would be collected at predetermined time intervals following an initial sample taken at $t_1$ (these data would correspond to the surface 32 in FIG. 2). When the features of surface 32 no longer produced useful fringes, the scanner would instantaneously shift, at $t_2$, to a higher constant speed corresponding to the slope of segment 42 in the plot and stop collecting intensity data until it reached a height approaching that of surface 34, which would again be expected to produce visible fringes. Then, the scanner would, at $t_3$, instantaneously shift to a slower constant speed equal to the slope of segment 44 (which may be the same as 40 or not) and data collection would resume to map the profile of surface 34. Under this ideal scenario the position z of the scanner at any time t can easily be calculated relative to its initial position $z_1$ at time $t_1$ because the motion of the scanner as a function of time is easily calculated from the constant-speed curves. LVDT technology and feed-back control make it possible to maintain the scanner speed at a predetermined, nearly constant, speed during operation.

Figure 4:
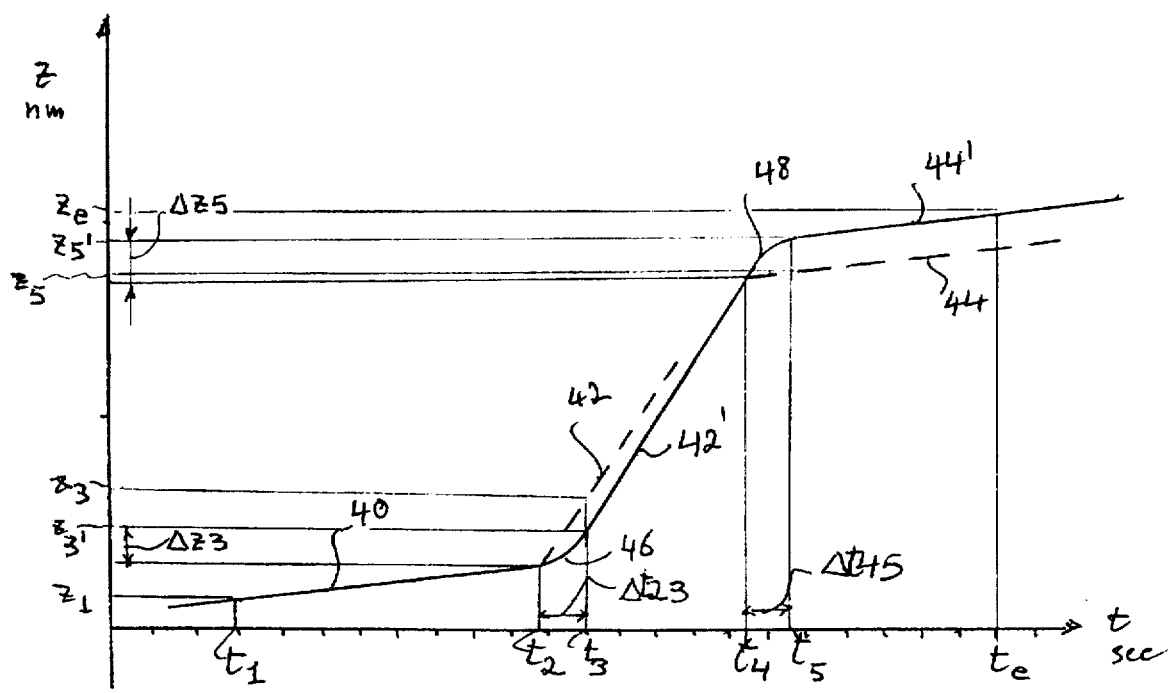
FIG. 4 illustrates the effects of inertial forces during the transition between different levels of constant-speed operation.

In the real world, practical problems arise from the nonlinearity of the scanning motion during the transition periods following $t_2$ and $t_3$ (FIG. 3). FIG. 4 illustrates the effects of inertial forces during the transition between different levels of constant-speed operation. Instead of switching immediately to a higher constant speed (the same speed corresponding to segment 42 of FIG. 3 is shown in broken line for comparison purposes), the scanner progressively ramps up to the same constant speed (illustrated by segment 42') through a first transition period of accelerating speed between $t_2$ and $t_3$ illustrated by arc 46. Thus, during the corresponding transition time $\Delta t23$, the scanner reaches only the height $z_3$, instead of the theoretical height $z_3$ it would have reached under the ideal conditions illustrated by curve 42. Similarly, after the second velocity switch at $t_4$, the scanner progressively slows down to the constant speed corresponding to the slope of segment 44' through a second transition period of decelerating speed illustrated by arc 48 between $t_4$ and $t_5$. During the corresponding transition time $\Delta t45$, the scanner reaches the height $z_5$, instead of only the theoretical height $z_5$ it would have reached under the ideal conditions illustrated by segment 44.

Figure 5:
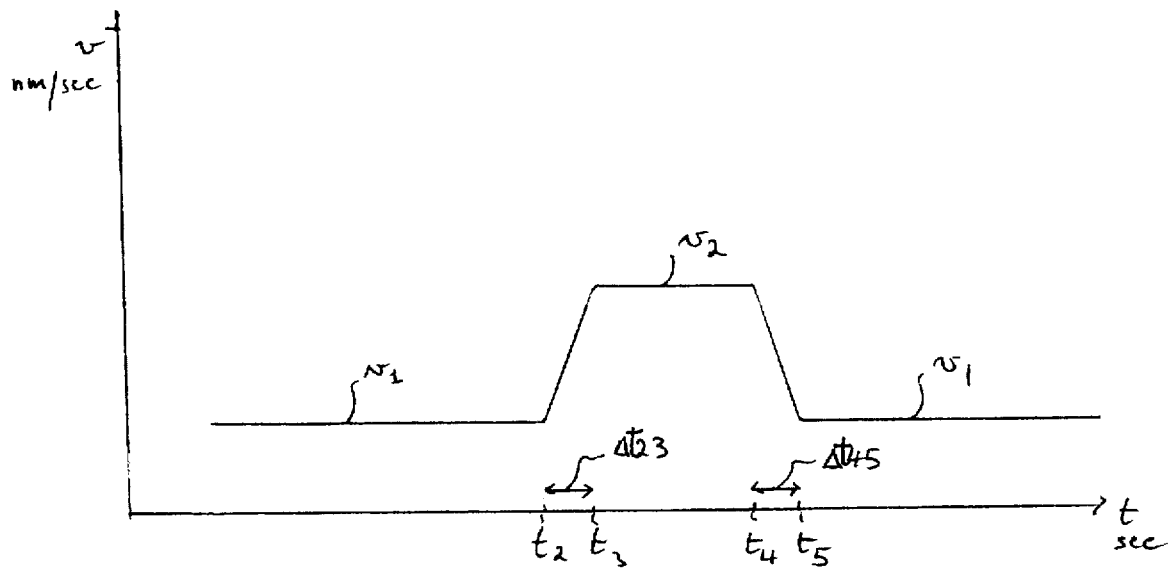
FIG. 5 illustrates the typical acceleration and deceleration observed in transitions between an initial constant speed to a higher intermediate constant speed and back to the initial speed.

Plotting velocity-versus-time data for the scanner in transition between periods of constant-speed operation, we discovered that the acceleration and deceleration rates during the transition periods $\Delta t23$ and $\Delta t45$ are approximately constant. Accordingly, we utilize this property to estimate the distances $\Delta z3$ and $\Delta z5$ traveled by the scanner during the transition times $\Delta t23$ and $\Delta t45$, respectively. FIG. 5 illustrates the typical acceleration and deceleration observed in transitions between an initial constant speed $v_1$ to an intermediate constant speed $v_2$ and back to a speed equal to $v_1$. By calculating the derivative of the curve shown in FIG. 5 (that is, by calculating the derivative of the velocity plot— the acceleration of the scanner), it is possible to ascertain the duration of each transition period by identifying the time periods during which the velocity curve is not constant (i.e., the times during which the acceleration is not zero). The same transition periods shown in FIG. 4 ($\Delta t23$ and $\Delta t45$) are used in FIG. 5 for simplicity of illustration. Using the equations of motion with constant acceleration, we know that in general the distance $\Delta z$ traveled during a period of transition $\Delta t$ from an initial constant velocity $v_1$ to another constant velocity $v_2$ is given by the expression $$\Delta z = \Delta t(v_1+v_2)/2. \tag{1}$$

Applying Equation 1 to the example illustrated by FIGS. 3 and 4, it is possible to calculate the scanning distances $\Delta z3$ and $\Delta z5$ traveled during each transition period $\Delta t23$ and $\Delta t45$, respectively, as follows:

$$\Delta z3 = \Delta t23(v_1+v_2)/2 \text{ and} \tag{2}$$

$$\Delta z5 = \Delta t45(v_2+v_1)/2, \tag{3}$$

where $v_1$ and $v_2$ are the constant speeds corresponding to the segments referenced as 40 and 42 in FIG. 3, respectively.

Thus, Equation 2 and 3 provide an easily implemented and fast procedure for calculating the distance traveled by a scanning mechanism in a variable-speed device according to the present invention. Moreover, since the device preferably utilizes the same constant speed whenever it is taking data (and faster speeds only to rapidly translate between heights of interest), the speed corresponding to segment 44' in FIG. 3 is also $v_1$, resulting in $\Delta z3$ and $\Delta z5$ being equal, which further simplifies the implementation of the procedure.

Figure 6:
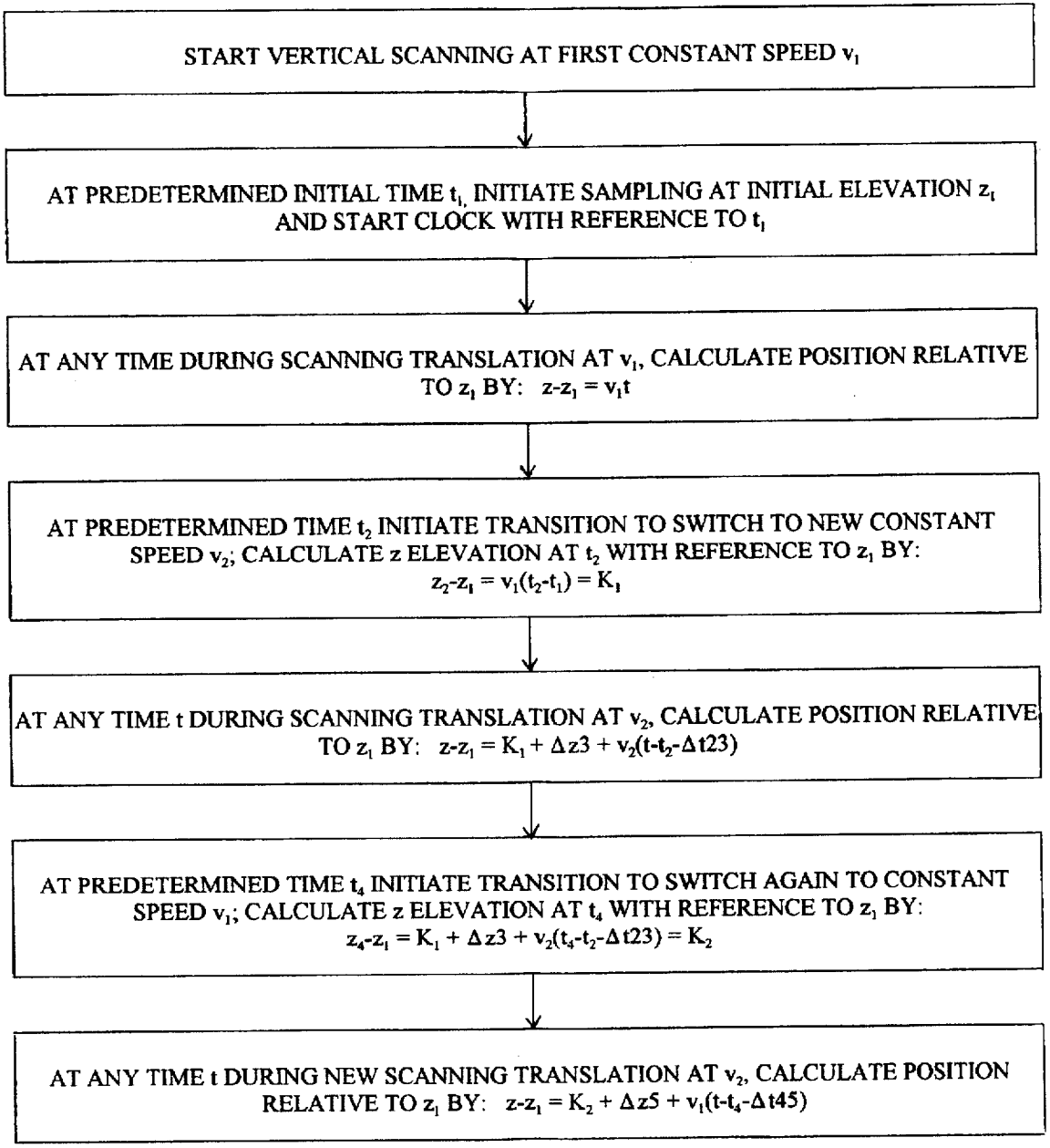
FIG. 6 is a schematic diagram of the preferred embodiment of the procedure of the invention.
Figure 1:
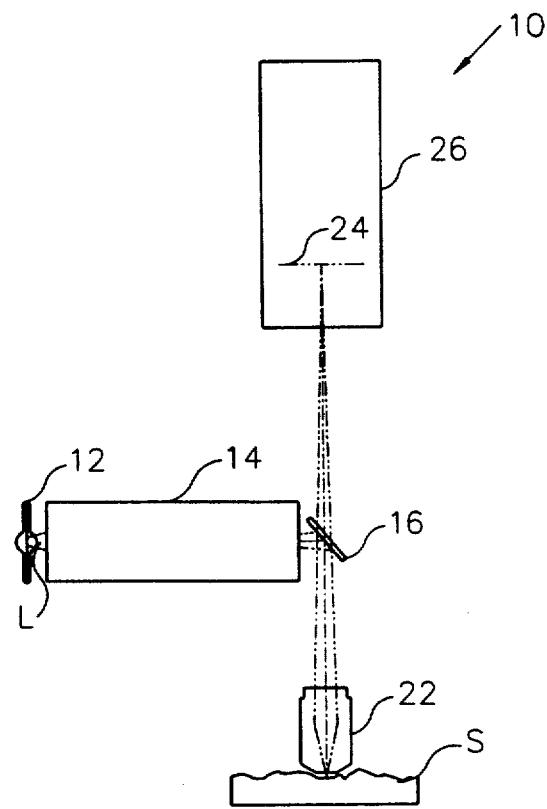
Figure 2:
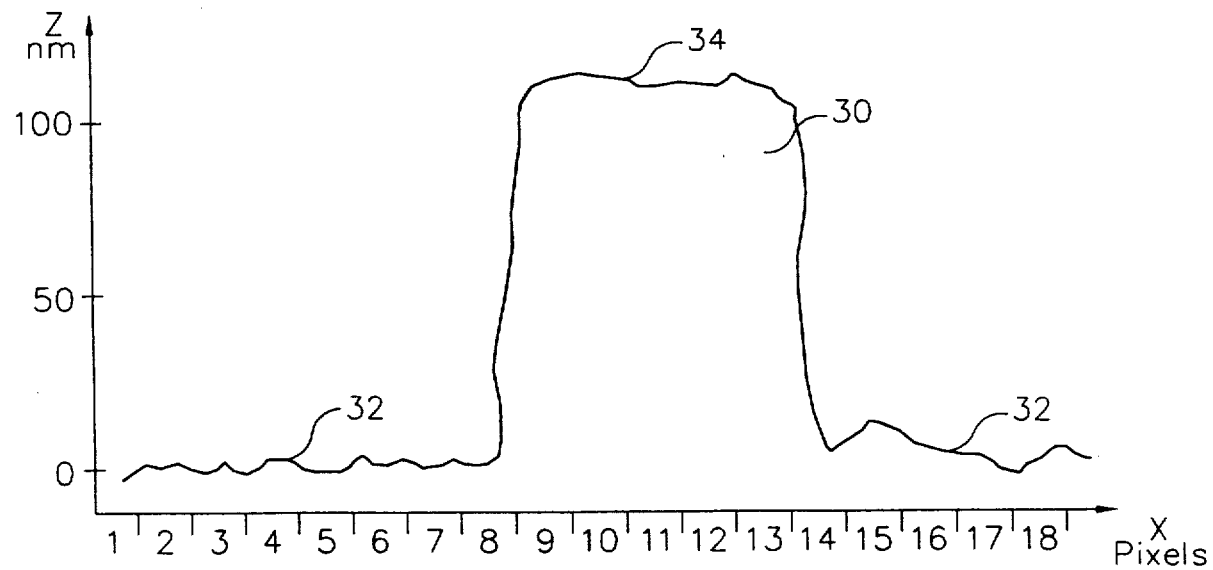
Figure 3:
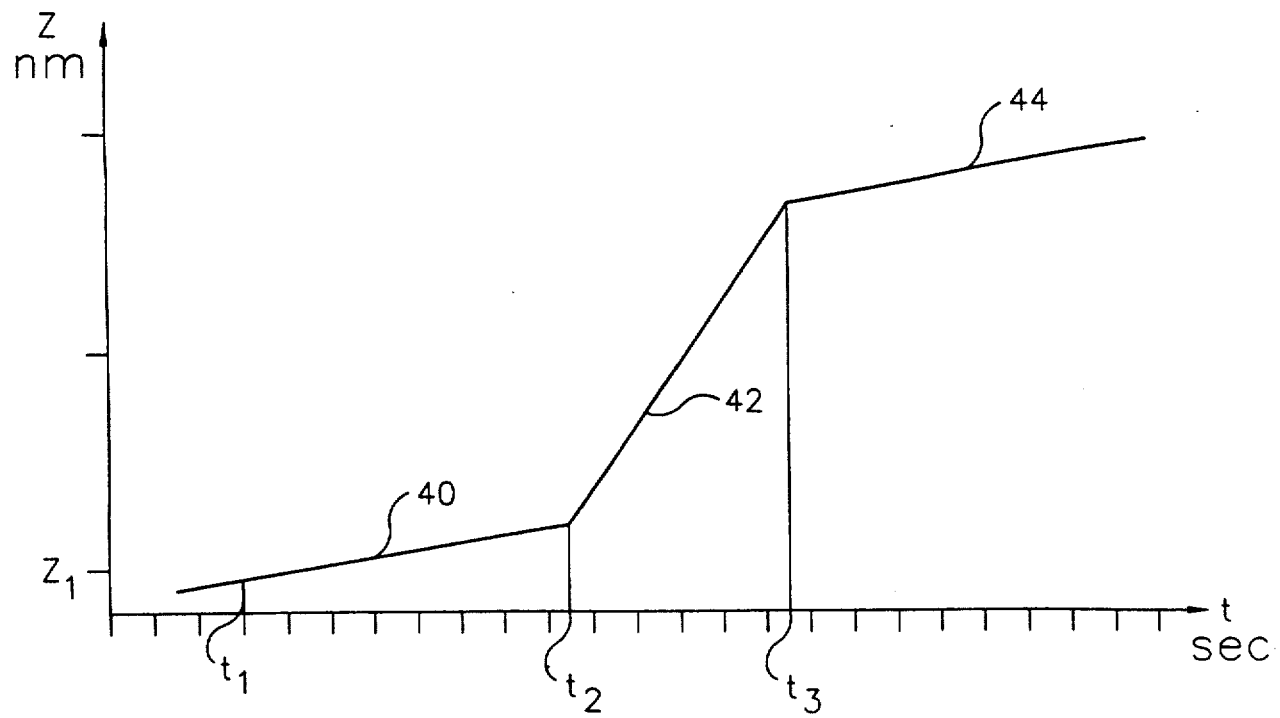
Figure 4:
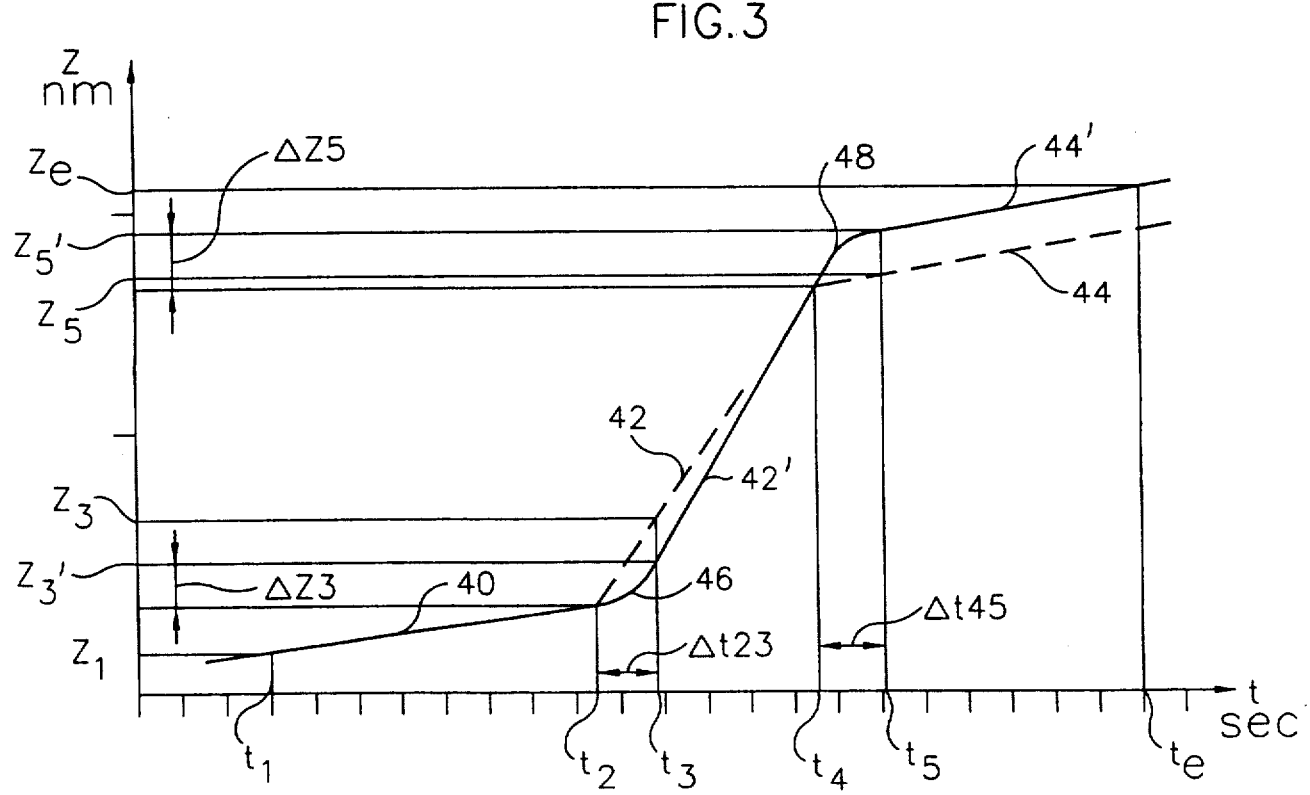
Figure 5:
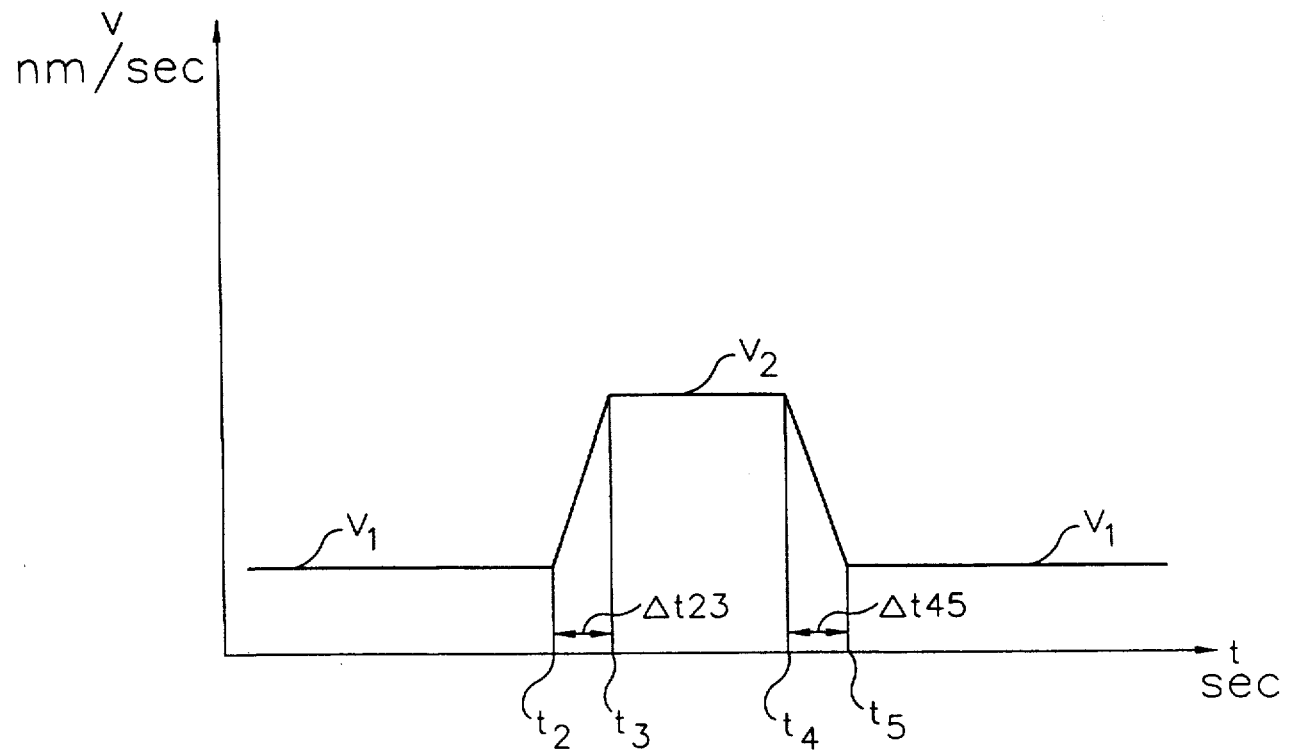
Figure 6:
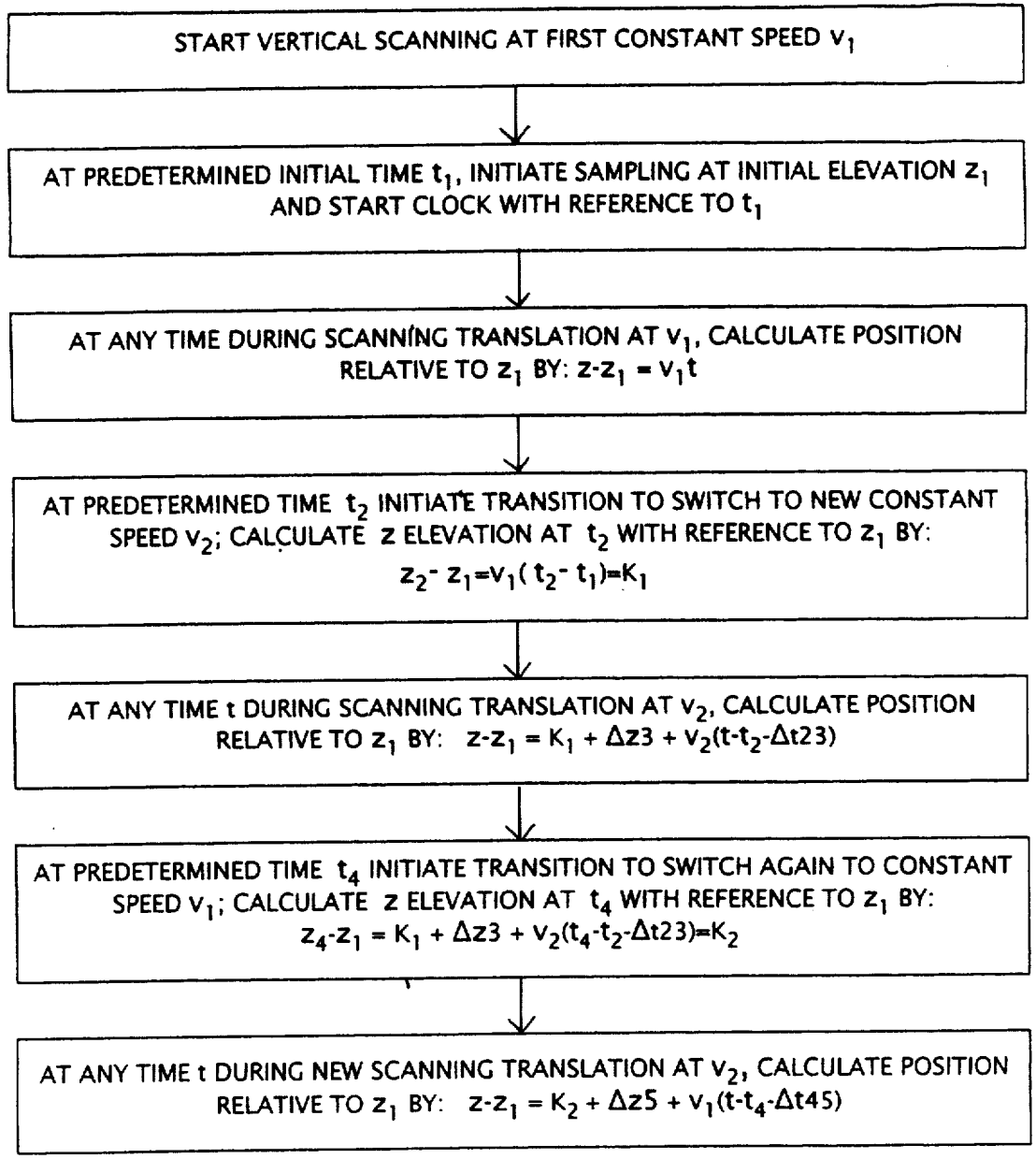

In practice, the interferometer is preferably calibrated utilizing LVDT-versus-time data and feed-back control to produce predetermined constant velocities $v_1$ and $v_2$, thereby establishing a fixed basis for calculating precise z positions as a function of time relative to an initial position $z_1$ corresponding to an initial time $t_1$ at which data sampling started. Based on $v_1$ and $v_2$, the motion of the scanner at each speed can be calculated exactly at each time subsequent to $t_1$. Then the instrument is calibrated to account for the nonlinearity of motion during transitions between $v_1$ and $v_2$ and viceversa. The calibration consists of calculating the distance $\Delta z$ traveled during each transition period of constant acceleration between $v_1$ and $v_2$ (or deceleration between $v_2$ and $v_1$) and adding these distances to the cumulative z positions traveled at $v_1$ and $v_2$. Therefore, after calibration the instrument can determine the exact scanner position at any time t with reference to its position at $t_1$ simply by calculating the distance traveled at constant speed using linear-motion equations and by adding a constant $\Delta z$ to account for the distance traveled during each period of transition. FIG. 6 is a schematic diagram of the procedure.

For example, referring to FIG. 4, the position $z_5$ of the scanner at time $t_5$ would be calculated as follows. The initial scanning time, $t_1$; the time the transition from $v_1$ to a higher speed $v_2$ was initiated, $t_2$; the time the transition back to the lower speed $v_2$ was initiated, $t_4$; and the sample time, $t_5$, are all known because they constitute predetermined inputs to the process. From the calibration procedure outlined above, $\Delta t23$, $\Delta z3$, $\Delta t45$ and $\Delta z5$ are also all known. Accordingly, the position traveled by the scanner during the time interval between $t_1$ and $t_5$ can be calculated by simple algebraic calculation by adding the distance corresponding to each velocity segment as follows:

$$z_e-z_1=(t_2-t_1)v_1+\Delta z3+(t_4-t_3-\Delta t23)v_2+\Delta z_5+(t_e-t_4-\Delta t45)v_1.$$

Nothing that $\Delta z3 = \Delta z5$ and $\Delta t23 = \Delta t45$, the expression above becomes:

$$z_e-z_1=(t_1-t_1)v_1+2\Delta z3+(t_4-t_2-\Delta t23)v_2+(t_e-t_4-\Delta t23)v_1.$$

As one skilled in the art would know, similar expressions are used to calculate the position of the scanner relative to the initial position $z_1$ at any time during sampling, thus providing the necessary information to perform interferometric measurements.

The invention has been described here illustrating a scanner moving upward with respect to the sample surface 32,34. In practice, it is often convenient to perform vertical scanning downward from an initial reference position. Clearly, the principles of the invention are applicable in all cases where scanning is performed at variable speeds to decrease dead time in the data collection process. With the motorized scanning device described in U.S. Pat. 5,446,547, a complete scan over about 500 μm can be accomplished at constant speed in about 625 seconds operating at about 0.4 volts. By incorporating the principles of the present invention for a sample surface having discontinuities about 100 μm high, a complete scan can be accomplished in about 60 seconds. This is achieved by increasing the speed of scanning by a factor of approximately 10 in the scanning range corresponding to sample discontinuities. Obviously, the speed at which continuous vertical scanning can be carried out in the regions of interest depends upon the speed at which the detector can be sampled by the electronics of the system and different scanning speeds may be provided for different degrees of desired accuracy, but in all cases the efficiency of operation is increased by adopting the concept of this invention. It is also noted that in practice different speeds can be obtained in linear increments simply by increasing the voltage applied to the actuating device for the scanning mechanism.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of performing white-light vertical-scanning interferometric measurements at multiple distances between a test sample and a reference arm aligned in an optical path between the sample and a light detector; wherein a scanning means is used to produce a relative translation between the sample and the reference arm to obtain said multiple distances; wherein said scanning means comprises actuating means adapted to cause said relative translation by operating on one of said sample and reference arm, such that it is translated with respect to the other of said sample and reference arm within said optical path; and wherein a surface of said test sample comprises first and second regions of interest separated by a region of step discontinuity within which useful interference fringes are outside the resolution capability of the scanning means, said method comprising the following steps:

(a) energizing said actuating means to cause said relative translation between the test sample and the reference arm at an initial constant speed;

(b) sampling an output of said detector at predetermined time intervals as needed to execute interferometric measurements of the first region of interest in the surface of said test sample;

(c) increasing the speed of said relative translation within said region of step discontinuity to an intermediate speed higher than said initial constant speed; and (d) reducing the speed of said relative translation to a secondary constant speed lower than said intermediate speed and suitable for interferometric measurements, and sampling the output of said detector at predetermined time intervals as needed to execute interferometric measurements of the second region of interest in the surface of the test sample.

2. The method of claim 1, wherein said intermediate speed is substantially constant.

3. The method of claim 1, wherein said initial constant speed is substantially equal to said secondary constant speed.

4. The method of claim 2, wherein said initial constant speed is substantially equal to said secondary constant speed.

5. The method of claim 2, further comprising the steps of estimating a first transition period and a first transition distance traveled by said scanning means during the first transition period from said initial constant speed to said intermediate constant speed, and of utilizing said first transition distance to calculate a position of said scanning means during translation within said region of step discontinuity.

6. The method of claim 5, further comprising the steps of estimating a second transition period and a second transition distance traveled by said scanning means during the second transition period from said intermediate constant speed to said secondary constant speed, and of utilizing said second transition distance to calculate a position of said scanning means during translation within said second region of interest.

7. The method of claim 4, further comprising the steps of estimating a transition period and a transition distance traveled by said scanning means during the transition period from said initial constant speed to said intermediate constant speed, of utilizing said transition distance to calculate a position of said scanning means during translation within said region of step discontinuity, and further of utilizing said transition distance also to calculate a position of said scanning means during translation within said second region of interest.

8. The method of claim 5, wherein said step of estimating a first transition period from said initial constant speed to said intermediate constant speed is carried out by identifying said first transition period as a first period of varying speed of the scanning means.

9. The method of claim 8, wherein said varying speed of the scanning means is carried out at a first constant acceleration.

10. The method of claim 6, wherein said step of estimating a second transition period from said intermediate constant speed to said secondary constant speed is carried out by identifying said second transition period as a second period of varying speed of the scanning means.

11. The method of claim 10, wherein said varying speed of the scanning means is carried out at a second constant acceleration.

12. The method of claim 7, wherein said step of estimating a transition period from said initial constant speed to said intermediate constant speed is carried out by identifying said transition period as a first period of varying speed of the scanning means.

13. The method of claim 12, wherein said varying speed of the scanning means is carried out at a constant acceleration.

14. A method of performing white-light verticals-scanning interferometric measurements at multiple distances between a test sample and a reference arm aligned in an optical path between the sample and a light detector; wherein a scanning means is used to produce a relative translation between the sample and the reference arm to obtain said multiple distances; wherein said scanning means comprises actuating means adapted to cause said relative translation by operating on one of said sample and reference arm, such that it is translated with respect to the other of said sample and reference arm within said optical path; and wherein a surface of said test sample comprises first and second regions of interest separated by a region of step discontinuity within which useful interference fringes are outside the resolution capability of the scanning means, said method comprising the following steps:

(a) energizing said actuating means to cause said relative translation between the test sample and the reference arm at an initial constant speed;

(b) beginning at a predetermined initial time, sampling an output of said detector at a corresponding initial position of the scanning means and at predetermined time intervals thereafter as needed to execute interferometric measurements of the first region of interest in the surface of said test sample;

(c) at a predetermined first shift time, increasing the speed of said relative translation within said region of step discontinuity to an intermediate constant speed higher than said initial constant speed;

(d) at a predetermined second shift time, reducing the speed of said relative translation to a secondary constant speed lower than said intermediate constant speed and suitable for interferometric measurements, and sampling the output of said detector at predetermined time intervals as needed to execute interferometric measurements of the second region of interest in the surface of the test sample;

(d) estimating a first transition period between said initial constant speed and said intermediate constant speed by identifying a first period of varying speed of the scanning means, and estimating a first transition distance traveled by said scanning means during the first transition period by setting said first period of varying speed of the scanning means at a first approximately constant acceleration;

(e) estimating a second transition period between said intermediate constant speed and said secondary constant speed by identifying a second period of varying speed of the scanning means, and estimating a second transition distance traveled by said scanning means during the second transition period by setting said second period of varying speed of the scanning means at a second approximately constant acceleration;

(f) utilizing said first and second transition distances to calculate a position of said scanning means, with respect to said initial position, at a sample time during translation within said second region of interest, said calculation being carried out by cumulatively adding the distances traveled by said scanning means as follows:

$$z = z_1 + z_2 + z_3 + z_4 + z_5,$$

where d is the position of the scanning means at the sample time, $z_1 = v_1(t_2 - t_1)$, $z_3 = v_2(t_4 - t_2 - \Delta t23)$, $z_5 = v_3(t - t_1 - \Delta t45)$, $v_1$ is the initial constant speed, $t_2$ is the first shift time, $t_1$ is the initial time, $z_2$ is the first transition distance, $v_2$ is the intermediate constant speed, $t_4$ is the second shift time, $\Delta t23$ is the first transition period, $z_4$ is the second transition distance, $v_3$ is the secondary constant speed, $\Delta t45$ is the second transition period, and t is the sample time of interest.

15. The method of claim 14, wherein said initial constant speed is substantially equal to said secondary constant speed.

* * * * *

UNITED STATES PATENT AND TRADEMARK OFFICE
CERTIFICATE OF CORRECTION

PATENT NO : 5,726,754
DATED : March 10, 1998
INVENTOR(S): Andrews et al.

It is certified that error appears in the above-identified patent and that said Letters Patent are hereby corrected as shown below:

In Claim 14, column 8, line 65, replace the word "verticals" with --vertical--

In Claim 14, column 10, line 25, replace "$t_1$" with --$t_4$--

Replace the drawings containing Figures 1 through 6 with the attached four sheets of formal drawings containing Figures 1 through 6.

Signed and Sealed this

Second Day of June, 1998

BRUCE LEHMAN

*Attest:*

*Attesting Officer*     Commissioner of Patents and Trademarks